United States Patent
Kawashima et al.

(12) 
(10) Patent No.: US 10,978,716 B2
(45) Date of Patent: Apr. 13, 2021

(54) GAS DIFFUSION LAYER FOR FUEL BATTERY, MEMBRANE ELECTRODE ASSEMBLY, AND FUEL BATTERY

(71) Applicant: Panasonic Intellectual Property Management Co., Ltd., Osaka (JP)

(72) Inventors: Tsutomu Kawashima, Nara (JP); Yoshifumi Taguchi, Osaka (JP); Kenichi Ezaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 80 days.

(21) Appl. No.: 16/293,587

(22) Filed: Mar. 5, 2019

(65) Prior Publication Data
US 2019/0379064 A1    Dec. 12, 2019

(30) Foreign Application Priority Data

Jun. 7, 2018 (JP) .............................. JP2018-109397
Dec. 25, 2018 (JP) .............................. JP2018-240531

(51) Int. Cl.
*H01M 4/88*    (2006.01)
*H01M 8/1004*  (2016.01)
(Continued)

(52) U.S. Cl.
CPC ......... *H01M 4/8807* (2013.01); *B01J 21/185* (2013.01); *H01M 4/8605* (2013.01);
(Continued)

(58) Field of Classification Search
CPC ............ H01M 4/8807; H01M 8/1004; H01M 2008/1095; H01M 8/0232; H01M 8/0239; H01M 8/0243
See application file for complete search history.

(56) References Cited

U.S. PATENT DOCUMENTS

2003/0091891 A1    5/2003  Yoshida et al.
2003/0209428 A1*  11/2003  Hirahara ............. H01M 4/8605
                                                   204/294
(Continued)

FOREIGN PATENT DOCUMENTS

JP    2010-192425    9/2010
JP    2011-124237    6/2011
(Continued)

OTHER PUBLICATIONS

JP-2012054111-A English machine translation (Year: 2020).*
Extended European Search Report dated Aug. 1, 2019 in corresponding European Patent Application No. 19162302.4.

*Primary Examiner* — Ula C Ruddock
*Assistant Examiner* — Armindo Carvalho, Jr.
(74) *Attorney, Agent, or Firm* — Wenderoth, Lind & Ponack, L.L.P.

(57) ABSTRACT

A gas diffusion layer for a fuel battery is used, which is configured by a porous member containing conductive particles, conductive fibers and a polymer resin as main components. An aggregate of the conductive fibers is formed inside the porous member, and an area ratio of the aggregate in any cross-section of the porous member is 0.5% or more and 8% or less. Further, a membrane electrode assembly including the gas diffusion layer for the fuel battery is used. Further, a fuel battery including the gas diffusion layer for the fuel battery is used.

16 Claims, 7 Drawing Sheets

(51) Int. Cl.
*H01M 8/0239* (2016.01)
*H01M 8/0243* (2016.01)
*H01M 8/0234* (2016.01)
*H01M 4/96* (2006.01)
*B01J 21/18* (2006.01)
*H01M 4/86* (2006.01)
*H01M 8/1018* (2016.01)

(52) U.S. Cl.
CPC ....... *H01M 8/0234* (2013.01); *H01M 8/0239* (2013.01); *H01M 8/0243* (2013.01); *H01M 8/1004* (2013.01); *H01M 4/96* (2013.01); *H01M 2008/1095* (2013.01)

(56) References Cited

U.S. PATENT DOCUMENTS

| | | | | |
|---|---|---|---|---|
| 2007/0141448 | A1* | 6/2007 | Ueda | H01M 8/04194 |
| | | | | 429/450 |
| 2007/0166603 | A1* | 7/2007 | Nakanishi | H01M 4/92 |
| | | | | 429/450 |
| 2010/0068585 | A1* | 3/2010 | Hoppes | H01M 8/1007 |
| | | | | 429/498 |
| 2011/0076592 | A1* | 3/2011 | Yamauchi | H01M 8/0239 |
| | | | | 429/480 |
| 2011/0207025 | A1 | 8/2011 | Yamauchi et al. | |
| 2013/0040213 | A1 | 2/2013 | Ito et al. | |
| 2014/0087272 | A1* | 3/2014 | Takeuchi | H01M 4/8657 |
| | | | | 429/405 |
| 2015/0086901 | A1 | 3/2015 | Tatsuno | |
| 2018/0051172 | A1* | 2/2018 | Kawagishi | C08K 3/041 |

FOREIGN PATENT DOCUMENTS

| | | | |
|---|---|---|---|
| JP | 2012-054111 | | 3/2012 |
| JP | 2012054111 A | * | 3/2012 |
| JP | 4938133 B | | 5/2012 |
| JP | 2014-010715 | | 6/2016 |
| JP | 2016-126869 | | 7/2016 |
| WO | 2005/043656 | | 5/2005 |
| WO | 2013/147174 | | 10/2013 |
| WO | 2017/085901 | | 5/2017 |

* cited by examiner

GAS DIFFUSION LAYER FOR FUEL BATTERY, MEMBRANE ELECTRODE ASSEMBLY, AND FUEL BATTERY

TECHNICAL FIELD

The technical field relates to a gas diffusion layer included in a membrane electrode assembly for use in a fuel battery.

BACKGROUND

An example of a fuel battery is, for example, a polymer electrolyte fuel battery. The basic principle of the polymer electrolyte fuel battery is that, with one surface of a hydrogen ion conductive polymer electrolyte membrane exposed to a fuel gas such as hydrogen and the other surface to oxygen, water is synthesized by a chemical reaction via an electrolyte membrane, and thus, reaction energy generated at that time is electrically extracted.

A unit cell of a polymer electrolyte fuel battery has a membrane electrode assembly (hereinafter referred to as MEA) and a pair of conductive separators disposed on both surfaces of the MEA.

The MEA includes a hydrogen ion conductive polymer electrolyte membrane and a pair of electrode layers sandwiching the electrolyte membrane. The pair of electrode layers are formed on both surfaces of the polymer electrolyte membrane and have a catalyst layer containing carbon powder carrying a platinum group catalyst as a main component and a gas diffusion layer formed on the catalyst layer and possessing a current collection function, gas permeability, and water repellency.

Since the gas diffusion layer plays a role of uniformly supplying the gas supplied from the separator to the catalyst layer, it is necessary to have good gas permeability and gas diffusibility. Further, the gas diffusion layer needs to have excellent conductivity as a conductive route of electrons between the catalyst layer and the separator. For this reason, a conductive porous member is used for the gas diffusion layer.

Further, the gas diffusion layer is required to have high water repellency so that excessive moisture generated by the cell reaction in the catalyst layer is quickly removed and discharged to the outside of the MEA system, and pores of the gas diffusion layer are not blocked by the generated water. Therefore, in the gas diffusion layer, water repellent treatment is performed on the conductive porous member with a fluororesin or the like. Furthermore, a water repellent layer containing a water repellent resin such as a carbon powder and a fluororesin as main components is generally used on a side of the conductive substrate in contact with the catalyst layer.

In this way, the conductive substrate is subjected to the water repellent treatment so that blockage by the generated water of the pores of the gas diffusion layer is prevented. Further, the water repellency of the water repellent layer is made to be higher than that of the conductive substrate, excessive moisture generated in the catalyst layer can be quickly discharged to the outside of the MEA system.

Such gas diffusion layer is disclosed in, for example, Japanese Patent No. 4938133 (JP '133), WO2017/085901 (WO '901), and WO2005/043656 (WO '656).

The gas diffusion layer of JP '133 is configured by a porous member containing conductive particles and a polymer resin as main components, with carbon fibers having a weight smaller than that of the polymer resin added.

The gas diffusion layer of WO '901 is configured by a porous member containing conductive particles and a polymer resin as main components, with carbon fibers having a weight smaller than that of the polymer resin added, and includes pores of 0.01 to 0.05 µm and vacancies of 1 to 200 µm inside.

The gas diffusion layer of WO '656 is a sheet with a thickness of 0.05 to 2 mm and made by a mixture of fine carbon fibers and conductive particles and water repellent resin particles having a fiber diameter of 0.5 to 500 nm, a fiber length of 1000 µm or less, and a central axis made of a hollow structure.

SUMMARY

However, it is desired to further improve the gas permeability and the water discharge property of the gas diffusion layer.

An object of the present disclosure is to provide a gas diffusion layer for a fuel battery having sufficient gas permeability and water discharge property, a membrane electrode assembly, and a fuel battery.

In order to achieve the above object, the inventors have made an intensive study and as a result have determined that, a gas diffusion layer configured by conductive particles, conductive fibers, and a polymer resin, in which an aggregate of the conductive fibers is formed inside the gas diffusion layer, can greatly improve the gas permeability and water discharge property which are problems of the gas diffusion layer, and therefore, the power generation performance of the fuel battery is improved.

In order to achieve the above object, the disclosure is configured as follows. A gas diffusion layer for a fuel battery of the disclosure is configured by a porous member containing conductive particles and conductive fibers and a polymer resin as main components, in which an aggregate of the conductive fibers is formed inside the porous member, and an area ratio of the aggregate in any cross-section of the porous member is 0.5% or more and 8% or less.

The disclosure can provide a gas diffusion layer for a fuel battery having sufficient gas permeability and water discharge property, a membrane electrode assembly, and a fuel battery.

DESCRIPTION OF EMBODIMENTS

Hereinafter, embodiments of the disclosure will be described with reference to the drawings.

Figure 1:
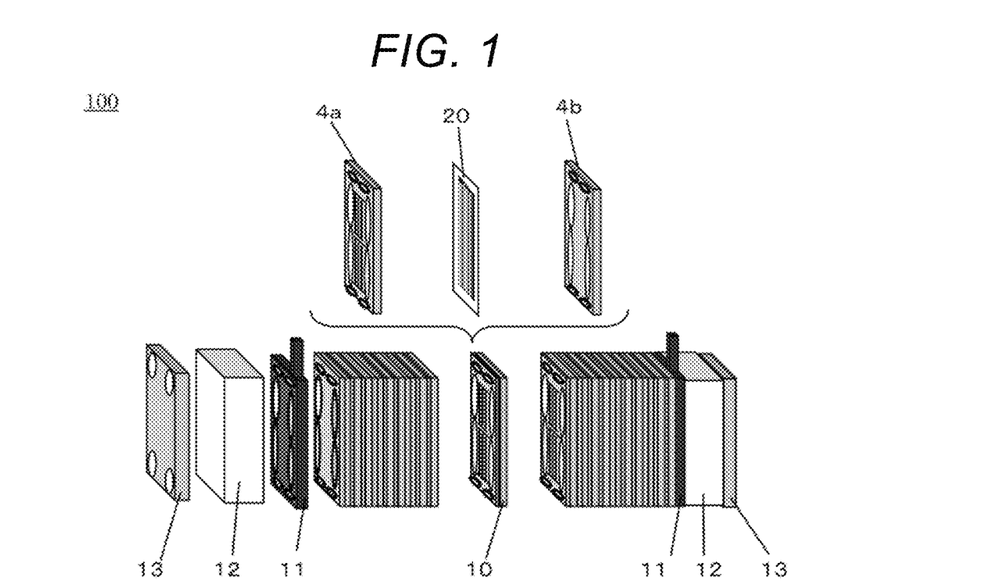
FIG. 1 is a schematic diagram of a polymer electrolyte fuel battery stack according to an embodiment of the disclosure.

With reference to FIG. 1, a basic configuration of a fuel battery 100 according to an embodiment of the disclosure will be described. FIG. 1 is a schematic diagram of a polymer electrolyte fuel battery stack according to the embodiment. Note that, the embodiment is not limited to a polymer electrolyte fuel battery and can be applied to various fuel batteries.

<Fuel Battery 100>

As shown in FIG. 1, the fuel battery 100 is formed by stacking a plurality of battery cells 10 as basic units and compressing and fastening current collection plates 11, insulating plates 12, and end plates 13 disposed on both sides of the stacked battery cells 10 with a predetermined load.

The current collection plate 11 is formed by a gas impermeable conductive material. For example, copper, brass, or the like is used for the current collection plate 11. A current extraction terminal portion (not shown) is provided in the current collection plate 11, and current is extracted from the current extraction terminal portion during power generation.

The insulating plate 12 is formed by an insulating material such as resin. For example, a fluorine-based resin, a PPS resin, or the like is used for the insulating plate 12.

The end plate 13 fastens and maintains the plurality of stacked battery cells 10, the current collection plate 11, and the insulating plate 12 with the predetermined load by a pressure unit (not shown). A metal material with high rigidity such as steel is used for the end plate 13.

Figure 2:
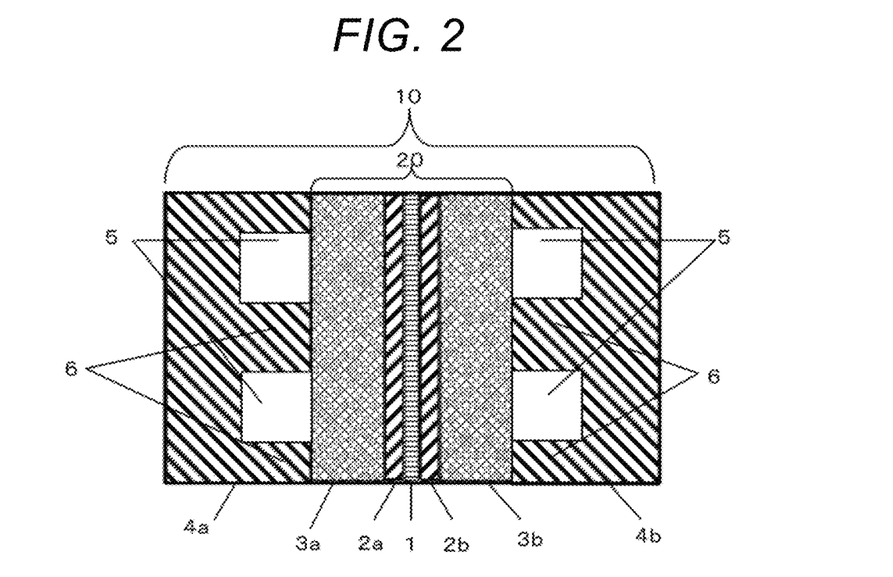
FIG. 2 is a cross-sectional view showing a schematic configuration of a polymer electrolyte fuel battery cell according to the embodiment of the disclosure.

FIG. 2 is a cross-sectional view showing a schematic configuration of the battery cell 10. The battery cell 10 has a configuration in which an MEA 20 is sandwiched between an anode side separator 4a and a cathode side separator 4b.

Hereinafter, the anode side separator 4a and the cathode side separator 4b are collectively referred to as a separator 4. Same description will be given for other constituent elements also when a plurality of constituent elements are collectively described.

Fluid flow paths 5 are formed in the separator 4. A fluid flow path 5 for fuel gas is formed on the anode side separator 4a. A fluid flow path 5 for an oxidizing gas is formed on the cathode side separator 4b. A carbon-based material or a metal-based material can be used for the separator 4.

The fluid flow path 5 is a groove portion formed in the separator 4. A rib portion 6 is provided around the fluid flow path 5.

The MEA 20 includes a polymer electrolyte membrane 1, a catalyst layer 2, and a gas diffusion layer 3. An anode catalyst layer 2a, a cathode catalyst layer 2b (collectively, a catalyst layer 2) are formed on both surfaces of the polymer electrolyte membrane 1 that selectively transports hydrogen ion; further, an anode side gas diffusion layer 3a, a cathode side gas diffusion layer 3b (collectively, a gas diffusion layer 3) are disposed on the outside of the catalyst layer 2.

Though the polymer electrolyte membrane 1 uses, for example, a perfluorocarbon sulfonic acid polymer, it is not particularly limited as long as it has proton conductivity.

The catalyst layer 2 can use a layer containing a carbon material carrying catalytic particles such as platinum and a polymer electrolyte.

<Configuration Example of Gas Diffusion Layer>

Next, with reference to FIGS. 3A and 3B, a configuration of the gas diffusion layer 3 according to the embodiment of the disclosure will be described in detail.

Figure 3A:
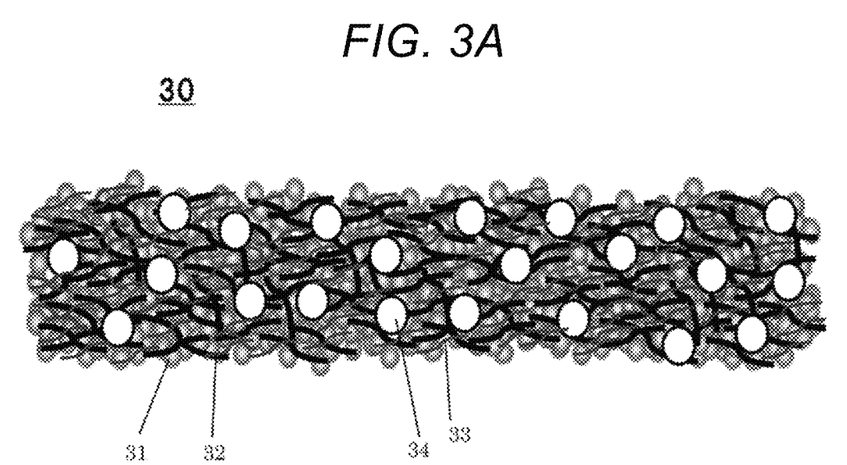
FIG. 3A is a schematic diagram showing a schematic configuration of a cross-section of a gas diffusion layer according to the embodiment of the disclosure.
Figure 3B:
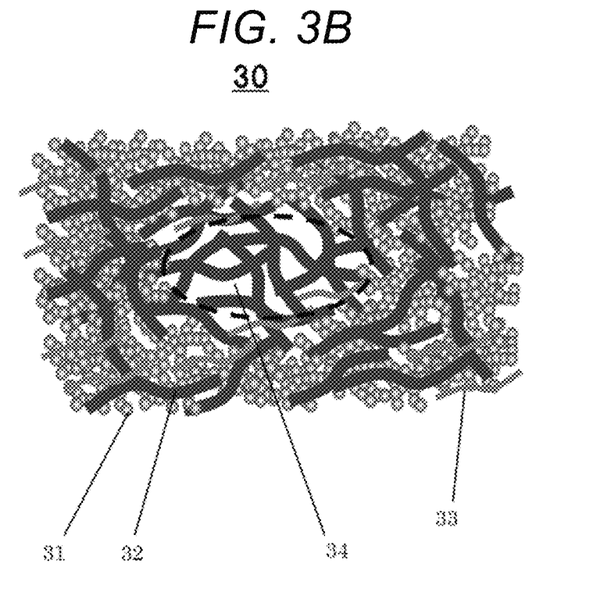
FIG. 3B is an enlarged schematic diagram of the cross-section of the gas diffusion layer according to the embodiment of the disclosure.

FIG. 3A is a cross-sectional view showing a schematic configuration of the gas diffusion layer 3. FIG. 3B is an enlarged cross-sectional view of the gas diffusion layer 3. The gas diffusion layer 3 is configured by a porous member 30 containing conductive particles 31, conductive fibers 32, and a polymer resin 33 as main components. In the porous member 30, the amount of the conductive fibers 32 is larger than the amount of the conductive particles 31. As a result, the porous member 30 includes an aggregates 34 inside the conductive fibers 32.

For example, a carbon material such as carbon black, graphite, activated carbon can be used for the conductive particles 31. Particularly, it is preferable to use carbon black having high conductivity and large pore volume for the conductive particles 31. Further, acetylene black, Ketjen black, furnace black, and vulcan can be used as carbon black for the conductive particles 31. Particularly, it is preferable to use acetylene black having small impurity quantity or Ketjen black having a large specific surface area and high conductivity for the conductive particles 31.

For example, a carbon nanotube can be used for the conductive fibers 32. It is preferable that a fiber diameter of the carbon nanotube as the conductive fibers 32 is 50 nm or more and 300 nm or less and a fiber length thereof is 1 μm or more and 50 μm or less. The reasons are as follows.

In a case where the fiber diameter of the carbon nanotube is less than 50 nm or the fiber length is less than 1 μm, in the gas diffusion layer 3, it is impossible to obtain strength enough to have a structure (so-called self-supporting structure) supported by only the conductive particles, the conductive fibers and the polymer resin.

On the other hand, in a case where the fiber diameter of the carbon nanotube is larger than 300 nm or the fiber length is longer than 50 μm, water retention property of the gas diffusion layer is deteriorated since the pores formed in gaps between the conductive fibers 32 become larger. Particularly, battery performance of the fuel battery 100 during low humidification operation is deteriorated. Accordingly, it is preferable that the values of the fiber diameter and the fiber length of the carbon nanotube as the conductive fibers 32 are set within the above ranges.

Examples of the material of the polymer resin 33 include polytetrafluoroethylene (PTFE), tetrafluoroethylene-hexafluoropropylene copolymer (FEP), polyvinylidene fluoride (PVDF), tetrafluoroethylene-ethylene copolymer (ETFE), polychlorotrifluoroethylene (PCTFE), Polyfluoroethylene-perfluoroalkyl vinyl ether copolymer (PFA), and the like. Particularly, as the material of the polymer resin 33, it is preferable to use the PTFE from viewpoints of heat resistance, water repellency, and chemical resistance. Though examples of a raw material form of the PTFE include dispersion and a powder form, the dispersion is more preferably used due to excellent dispersibility thereof.

The polymer resin 33 has a function as a binder that binds the conductive particles 31 to each other. Further, the polymer resin 33 has water repellency. Accordingly, water is prevented from retaining in the pores inside the gas diffusion layer 3 to inhibit gas permeation.

<Aggregate 34 of Conductive Fibers 32>

The aggregate 34 of the conductive fibers 32 refers to an aggregate of conductive fibers remaining as a clump without being crushed in a dispersing step at the time of manufacturing the conductive fibers 32. Only 10% or less of the conductive particles 31 exist inside the aggregate 34 of the conductive fibers 32. The reasons are as follows.

The aggregate 34 has a structure in which the conductive fibers 32 are intertwined with each other. A diameter of the pores (pore diameter) which are gaps between the conductive fibers 32 constituting the aggregate 34 is 0.05 μm or more and 0.5 μm or less. Meanwhile, a size of the conductive particles 31, for example, the carbon black such as acetylene black and Ketjen black is 0.1 μm to 1 μm as a primary aggregate (aggregate) in which dozens of domains (primary particle) having a particle diameter of 0.01 μm to 0.05 μm are fused. The aggregate forms a secondary aggregate (agglomerate) by physical force such as Van der Waals forces. However, the agglomerate is rarely dispersed to a size of the aggregate completely in the dispersing step since the bond strength is strong. Therefore, only a small amount of the conductive particles 31 such as the carbon black can penetrate into the pores of the aggregate 34 of the conductive fibers 32. Accordingly, as described above, only 10% or less of the conductive particles 31 exist inside the aggregate 34 of the conductive fibers 32.

The size of each aggregate 34 of the conductive fibers 32 is in a range of 1 μm to 20 μm for both a short diameter and a long diameter. This is due to the fact that in a case where the size of the aggregate 34 is smaller than 1 μm, the aggregate 34 does not function sufficiently as a gas diffusion route or water discharge route; on the other hand, in a case where the size of the aggregate 34 is larger than 20 μm, the conductivity is deteriorated since the conductive particles 31 hardly exist between the conductive fibers 32.

Further, an area ratio of the aggregates 34 is 0.5% or more and 5% or less in any cross-section of the gas diffusion layer 3. The reasons are as follows. In a case where the area ratio is smaller than 0.5%, sufficient gas diffusibility and water discharge property cannot be ensured, and battery performance is deteriorated. On the other hand, in a case where the area ratio is larger than 5%, the conductivity and the battery performance are deteriorated.

<Calculation Method of Area Ratio of Aggregate 34>

A calculation method of an area ratio of the aggregate 34 of the conductive fibers 32 in any cross-section of the gas diffusion layer 3 (porous member 30) is as follows. First, the gas diffusion layer 3 is cut, the cross-section is grinded, and then a cross-sectional photograph is taken by an SEM or an optical microscope. Then, the area ratio can be calculated from an area ratio of the aggregate to a total cross-sectional area by selecting the aggregates having a size of of 1 μm to 20 μm in the cross-sectional photograph.

Figure 4A:
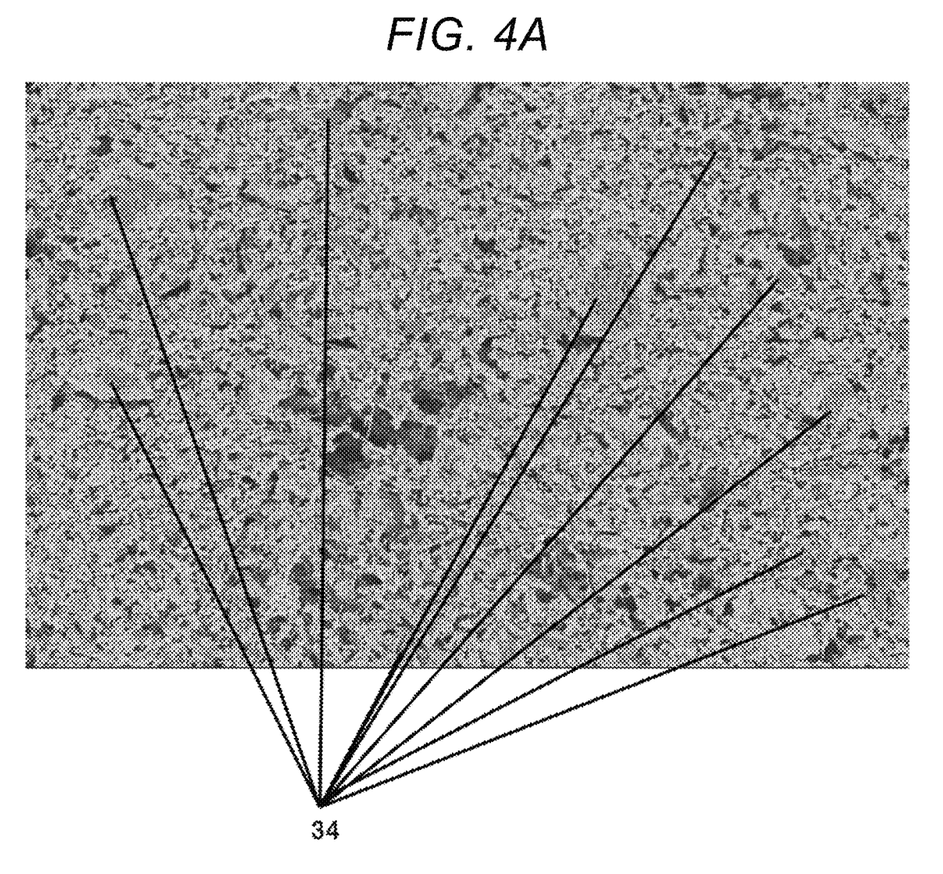
FIG. 4A is a cross-sectional SEM photograph of the gas diffusion layer according to the embodiment of the disclosure.
Figure 4B:
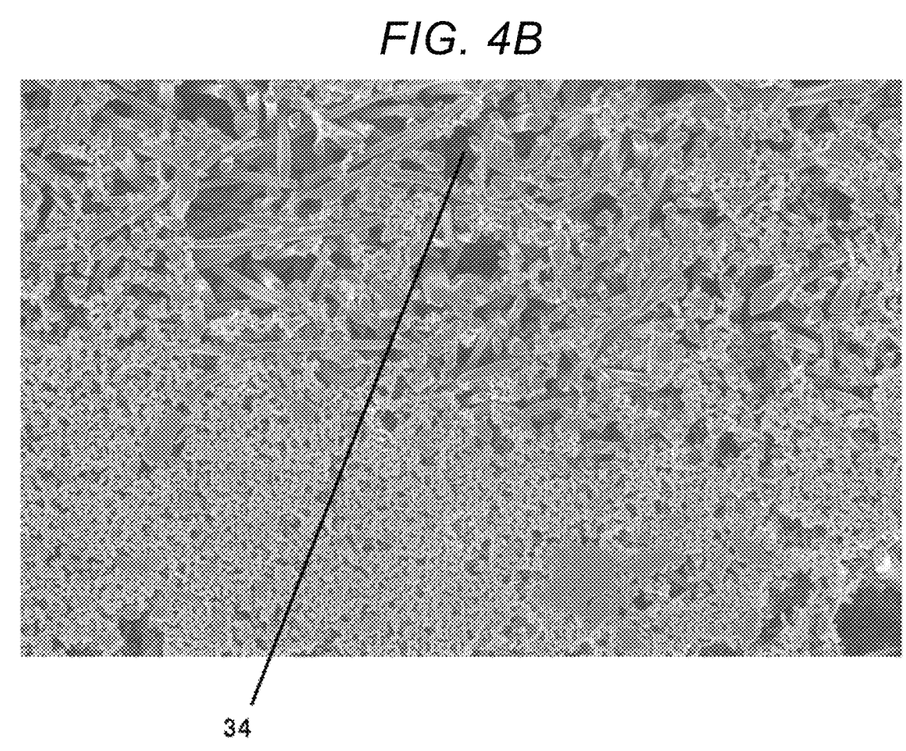
FIG. 4B is a cross-sectional SEM photograph of the gas diffusion layer according to the embodiment of the disclosure.

FIG. 4A is a cross-sectional SEM photograph of the gas diffusion layer 3, and FIG. 4B is an enlarged photograph of the cross-sectional SEM of the gas diffusion layer 3. The conductive particles 31, the conductive fibers 32, and the aggregates 34 of the conductive fibers 32 can be confirmed in FIGS. 4A and 4B. Note that, in FIGS. 4A and 4B, the fine polymer resin 33 in a fibrous form is not observed due to damage by electron beams at the time of SEM observation.

As described above, in order to obtain the aggregates 34 of the conductive fibers 32, the gas diffusion layer 3 contains more conductive fibers 32 than the conductive particles 31. This is due to the fact that in a case where the amount of the conductive fibers 32 is smaller than the amount of the conductive particles 31, the conductive fibers 32 are crushed by the conductive particles 31 in a mixing and dispersing step, and the aggregate 34 hardly exists.

Specific examples of the amounts of the conductive particles 31, the conductive fibers 32 and the polymer resin 33 in the gas diffusion layer 3 are as follows. That is, it is preferable that the gas diffusion layer 3 is configured by, for example, 5 wt % or more and less than 35 wt % of the conductive particles 31, 35 wt % or more and 80 wt % or less of the conductive fibers 32, and 10 wt % or more and 40 wt % or less of the polymer resin 33.

<Cumulative Pore Volume and Pore Distribution of Gas Diffusion Layer 3>

A volume occupied by the pores in the gas diffusion layer 3, that is, the cumulative pore volume of the gas diffusion layer 3 is preferably 1.0 mL/g or more and 1.7 mL/g or less. The reasons are as follows. That is, in a case where the cumulative pore volume is smaller than 1.0 mL/g, the gas diffusion and water discharge routes are reduced and battery performance is deteriorated due to flooding. On the other hand, in a case where the cumulative pore volume is larger than 1.7 mL/g, the conductivity and the water retention property are deteriorated and the battery performance is deteriorated.

Further, a peak of pore diameter distribution of the gas diffusion layer 3 is preferably 0.05 μm or more and 0.5 μm or less. The reasons are as follows. That is, in a case where the peak of the pore diameter distribution is 0.05 μm or less, the pores are too small to obtain sufficient gas permeability and water discharge property. On the other hand, in a case where the peak of the pore diameter distribution is 0.5 μm or more, particularly during low humidification, water retention property is deteriorated, proton resistance is increased, and battery performance is deteriorated.

Note that, a measurement method of the cumulative pore volume and the pore distribution of the gas diffusion layer 3 is to measure by mercury porosimetry after drying the gas diffusion layer 3 at 120° C. for 4 hours as a pretreatment.

<Porosity of Gas Diffusion Layer 3>

It is preferable that the porosity of the gas diffusion layer 3 is 65% or more and 75% or less. The reasons are as follows. In a case where the porosity is lower than 65%, the gas diffusion and water discharge routes are reduced, and the battery performance is deteriorated due to flooding. On the other hand, in a case where the porosity is more than 75%, the conductivity and the water retention property are deteriorated and thus the battery performance is deteriorated.

Hereinafter, a calculation method (measurement method) of the porosity of the gas diffusion layer 3 will be described. First, an apparent true density of the manufactured gas diffusion layer 3 is calculated based on a true density and a composition ratio of each material constituting the gas diffusion layer 3. Next, a weight, a thickness, and a length and width size of the manufactured gas diffusion layer 3 are measured, and the density of the manufactured gas diffusion layer 3 is calculated. Next, the porosity is calculated by substituting the calculated density and the apparent true density of the gas diffusion layer 3 into a formula of porosity=(density of the gas diffusion layer 3)/(apparent true density)×100. As described above, the porosity of the manufactured gas diffusion layer 3 can be calculated.

<Amount of Collapse at the Time of Compression of Gas Diffusion Layer 3>

The gas diffusion layer 3 is compressed at a surface pressure of 7 kgf/cm² at the time of manufacturing the fuel battery 100. It is preferable that a thickness of the gas diffusion layer 3 after compression is 85% or more and 98% or less of the thickness before compression. The reasons are as follows. That is, in a case where the thickness of the gas diffusion layer 3 after compression is smaller than 85% of the thickness before compression, a load is applied at the time of compression by the rib portion 6 of the separator 4, and the pores inside the gas diffusion layer 3 are collapsed. In this case, gas diffusibility and water discharge property of a portion of the gas diffusion layer 3 in contact with the rib portion 6 are deteriorated, and thus the battery performance is deteriorated. Further, a cross-sectional area of the fluid flow path 5 provided in the separator 4 is reduced since the gas diffusion layer 3 hangs down, and thus pressure loss increases and the pressure loss varies depending on the degree of hanging down. On the other hand, in a case where the thickness of the gas diffusion layer 3 after compression is greater than 98% of the thickness before compression, adhesion between the gas diffusion layer 3 and the catalyst layer 2 is deteriorated, a gap is generated at an interface and the conductivity is deteriorated, and a membrane of generated water is generated in the gap and the gas diffusibility is deteriorated. Accordingly, it is preferable that the thickness of the gas diffusion layer 3 after compression is set within the above range with respect to the thickness before compression.

<Gas Permeability of Gas Diffusion Layer 3>

The gas permeability of the gas diffusion layer 3 is preferably set to have the Gurley number of 5 sec/100 ml or more and 150 sec/100 ml or less. The reasons are as follows. That is, in a case where the Gurley number is smaller than 5 sec/100 mL, particularly during low humidification, the water retention property is deteriorated, the proton resistance is increased, and the battery performance is deteriorated. On the other hand, in a case where the Gurley number is larger than 150 sec/100 ml, the gas permeability and water discharge property become insufficient and the battery performance is deteriorated.

Note that, the Gurley number is a numerical value measured as follows. When an inner cylinder is put in an outer cylinder filled with oil, the inner cylinder gradually descends due to the own weight of the inner cylinder, and gas in the inner cylinder is compressed. At this time, time required for a constant volume (100 mL) of gas to permeate through a test piece set in the outer cylinder is measured and is taken as the Gurley number. An area of a sample through which air permeates is 6.42 $cm^2$.

<Tensile Strength at Break of Gas Diffusion Layer 3>

It is preferable that the tensile strength at break of the gas diffusion layer 3 is 0.05 $N/mm^2$ or more. This is due to that in a case where the tensile strength at break of the gas diffusion layer 3 is smaller than 0.05 $N/mm^2$, it becomes difficult to handle the gas diffusion layer 3 as a self-supporting membrane. Note that, the self-supporting membrane means a membrane having a self-supporting structure. Therefore, the tensile strength at break of the porous member as the gas diffusion layer 3 is preferably 0.05 $N/mm^2$ or more, and the porous member is preferably a self-supporting membrane supported only by the conductive particles 31, the conductive fibers 32, and the polymer resin 33.

<Thickness of Gas Diffusion Layer 3>

It is preferable that the thickness of the gas diffusion layer 3 is 70 μm or more and 200 μm or less. The reasons are as follows. That is, in a case where the thickness is less than 70 μm, the strength of the gas diffusion layer 3 becomes weak and it becomes difficult to handle the gas diffusion layer 3 as a self-supporting membrane. Further, in a case where the thickness of the gas diffusion layer 3 is larger than 200 μm, the proton resistance is increased and the battery performance is deteriorated.

<Method of Manufacturing Gas Diffusion Layer 3>

Figure 5:
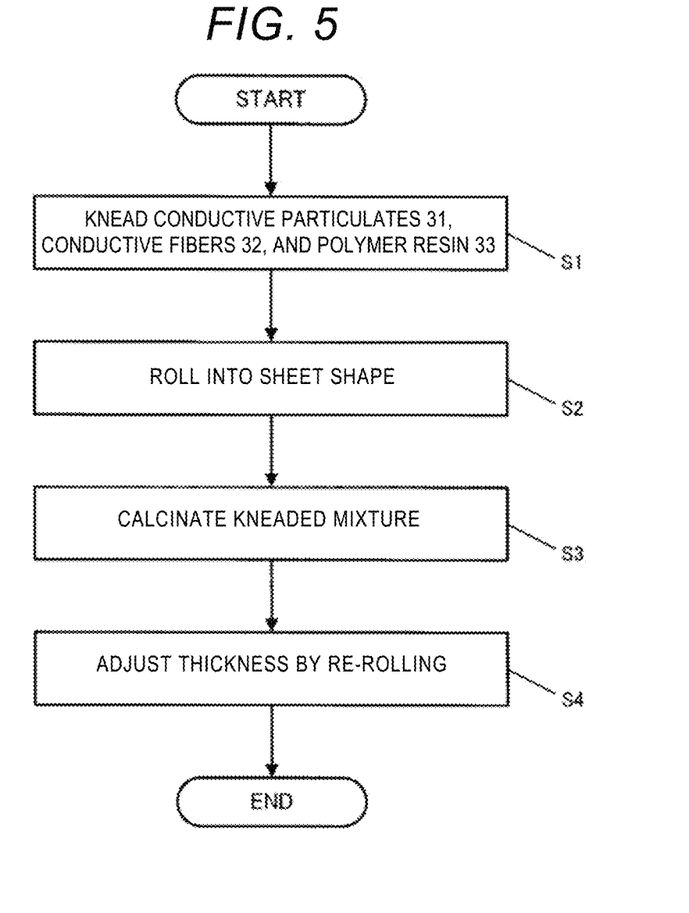
FIG. 5 is a flowchart for describing a method of manufacturing the gas diffusion layer according to the embodiment of the disclosure.

Next, a method of manufacturing the gas diffusion layer 3 according to the embodiment of the disclosure will be described. FIG. 5 is a flowchart for describing a method of manufacturing the gas diffusion layer 3.

In step S1, the conductive particles 31, the conductive fibers 32, the polymer resin 33, surfactant, and dispersion solvent are kneaded. Specifically, a carbon material as the conductive particles 31, a carbon nanotube as the conductive fibers 32, the surfactant, and the dispersion solvent are added, stirred, and kneaded. Thereafter, the polymer resin 33 is added and again stirred and kneaded to obtain a kneaded mixture.

For example, a planetary mixer, a hybrid mixer, a kneader, a roll mill can be used for kneading the material in step S1. In Step S1 which is the kneading step, except for the polymer resin 33, the conductive particles 31, the conductive fibers 32, the surfactant, and the dispersion solvent are kneaded and dispersed first, after which the polymer resin 33 is finally added and stirred, so that the polymer resin 33 can be uniformly dispersed in the kneaded mixture.

In step S2, the kneaded mixture is extended into a sheet shape while being rolled. For example, a rolling mill machine can be used for the rolling in step S2. For example, by rolling for one or a plurality of times under the condition of rolling from 0.001 ton/cm to 4 ton/cm, the polymer resin 33 can be suitably fiberized and the gas diffusion layer 3 having high strength can be obtained.

In step S3, the kneaded mixture extended to a sheet shape is calcinated, and the surfactant and the dispersion solvent are removed from the kneaded mixture.

For example, an IR furnace, a hot air drying oven can be used for calcination in step S3. A calcination temperature is set to be higher than a decomposition temperature of the surfactant and lower than a melting temperature of the polymer resin 33. The reasons are as follows. That is, in a case where the calcination temperature is lower than the decomposition temperature of the surfactant, gas permeability of the gas diffusion layer 3 is deteriorated since water is retained due to the fact that the surfactant remains inside the gas diffusion layer 3 and the inside of the gas diffusion layer 3 is made hydrophilic. On the other hand, in a case where the calcination temperature is higher than the melting point of the polymer resin 33, the strength of the gas diffusion layer 3 is deteriorated since the polymer resin 33 melts. Specifically, for example, when the polymer resin 33 is the PTFE, the calcination temperature is preferably 280° C. to 340° C.

In step S4, the sheet shaped kneaded mixture from which the surfactant and the dispersion solvent have been removed is re-rolled by a roll press machine to adjust the thickness. Accordingly, the gas diffusion layer 3 according to the embodiment of the disclosure can be manufactured.

For example, a roll press machine can be used for the re-rolling in step S4. For example, by re-rolling for one or a plurality of times under the condition of rolling from 0.01 ton/cm to 4 ton/cm, the thickness and the porosity of the gas diffusion layer 3 can be adjusted.

As in the examples shown so far, the disclosure is not limited to the above embodiment and can be implemented in various other modes.

<Modification of Gas Diffusion Layer>

Figure 6A:
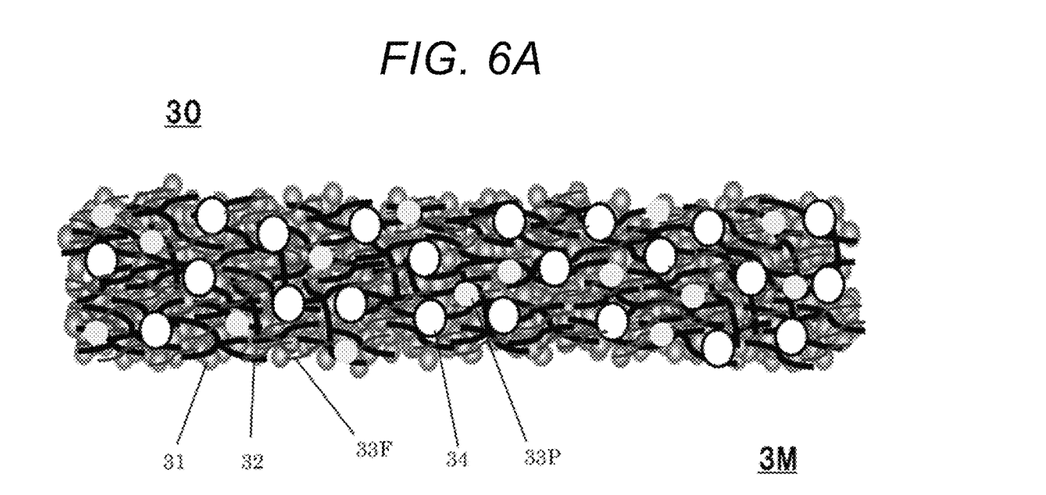
FIG. 6A is a schematic diagram showing a schematic configuration of a cross-section of a modification of the gas diffusion layer according to the embodiment of the disclosure.

As a modification of the gas diffusion layer 3 described above, a gas diffusion layer 3M will be described. FIG. 6A is a cross-sectional view showing a schematic configuration of a gas diffusion layer 3M as a modification. Further, FIG. 6B is an enlarged cross-sectional view showing the gas diffusion layer 3M as a modification.

Figure 6B:
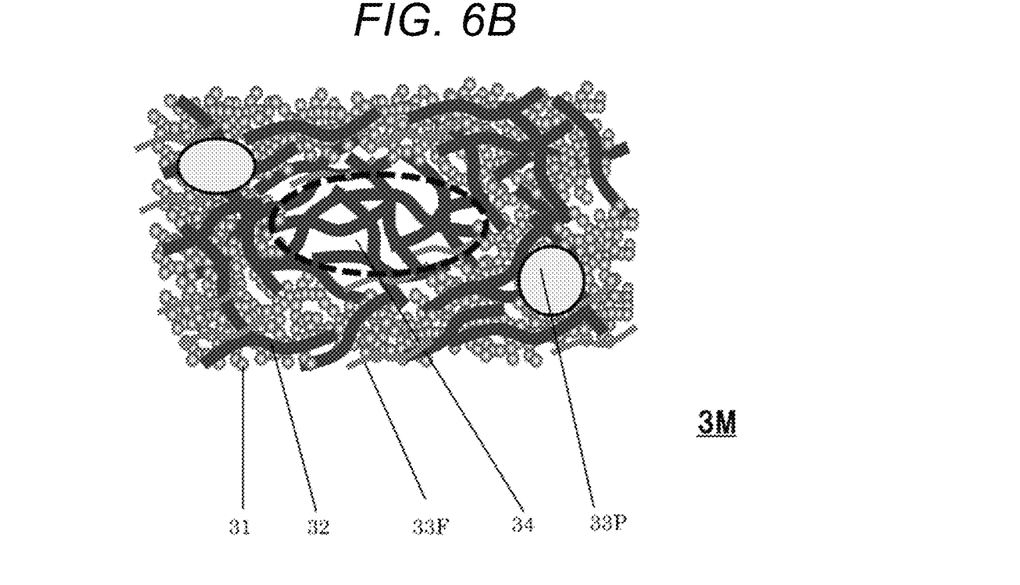
FIG. 6B is an enlarged schematic diagram of the cross-section of the modification of the gas diffusion layer according to the embodiment of the disclosure.

As shown in FIGS. 6A and 6B, the gas diffusion layer 3M is configured by a porous member 30 containing conductive particles 31, conductive fibers 32, and a fibrous polymer resin 33F which is a fine polymer resin in the fibrous form as main components. Further, the porous member 30 includes an aggregate 34 of the conductive fibers 32 and a particulate polymer resin 33P which is a polymer resin in a particulate form inside. That is, the gas diffusion layer 3M shown in FIGS. 6A and 6B is different from the gas diffusion layer 3 shown in FIGS. 3A and 3B in that the gas diffusion layer 3M includes the fibrous polymer resin 33F in the fibrous form as a polymer resin and the particulate polymer resin 33P in the particulate form.

In the present modification, the polytetrafluoroethylene (PTFE) is used as a material of the fibrous polymer resin 33F and the particulate polymer resin 33P. As well known, the PTFE has the property of becoming a fine fibrous form when a shearing force is applied. During the mixing and dispersing step or the sheet forming step at the time of manufacturing the gas diffusion layer 3M, shearing force is applied to the PTFE which is the material, and PTFE turns into the fine fibrous form. Accordingly, the fibrous polymer resin 33F is formed inside the gas diffusion layer 3M (porous member 30).

Such fibrous polymer resin 33F functions as a binder which binds the conductive particles and the conductive fibers, so that the gas diffusion layer 3M can have a self-supporting structure.

Meanwhile, the particulate polymer resin 33P is in the gas diffusion layer 3M as particles without being fiberized inside. The PTFE in the particulate form has higher water repellency in the vicinity of particles than fibrous PTFE. Therefore, the particulate polymer resin 33P suitably prevents water from retaining in the pores in the gas diffusion layer 3M so as to inhibit the gas permeation.

The size of the particulate polymer resin 33P is within a range of 0.1 to 10 μm for both the short diameter and the long diameter. This is due to the fact that a particle smaller than 0.1 μm does not exist at a raw material stage. On the other hand, in a case where the particle diameter is larger than 10 μm, the conductivity is deteriorated.

Further, in any cross-section of the gas diffusion layer 3M (porous member 30), an area ratio of the particulate polymer resin 33P is 0.1% or more and 1% or less. The reasons are as follows. That is, in a case where the area ratio of the particulate polymer resin 33P is smaller than 0.1%, the water repellent effect inside the gas diffusion layer 3M becomes small and water is easily retained in the pores. On the other hand, in a case where the area ratio is larger than 1%, the conductivity and the battery performance are deteriorated.

In the gas diffusion layer 3M, the amounts of the conductive particles 31, the conductive fibers 32, and the polymer resin in which the fibrous polymer resin 33F is combined with the particulate polymer resin 33P are the same as those of the gas diffusion layer 3 described above. That is, specifically, the conductive particles 31 may be set to 5 wt % or more and less than 35 wt %; the conductive fibers 32 may be set to 35 wt % or more and 80 wt % or less; and the polymer resin in which the fibrous polymer resin 33F is combined with the particulate polymer resin 33P may be set to 10 wt % or more and 40 wt % or less. The reasons are as follows. That is, in a case where the amount of the polymer resin is less than 10 wt %, a shearing force is applied to the entire polymer resin at the time of manufacturing the gas diffusion layer 3. In this case, almost all of the polymer resin becomes the fibrous polymer resin 33F, and the particulate polymer resin 33P hardly exists. On the other hand, in a case where the amount of the polymer resin is more than 40 wt %, the proportion of the particulate polymer resin 33P increases and the conductivity of the gas diffusion layer 3 is deteriorated.

<Calculation Method of Area Ratio of Particulate Polymer Resin>

A calculation method of an area ratio of the particulate polymer resin 33P in any cross-section of the gas diffusion layer 3M (porous member 30) is as follows. First, the gas diffusion layer 3M is cut, the cross-section is grinded, and then a cross-sectional photograph is taken by an SEM or an optical microscope. Then, the area ratio can be calculated from an area ratio of the polymer resin in the particulate form to a total cross-sectional area by selecting the particulate polymer resin 33P of 0.1 μm to 10 μm in the cross-sectional photograph.

Figure 7:
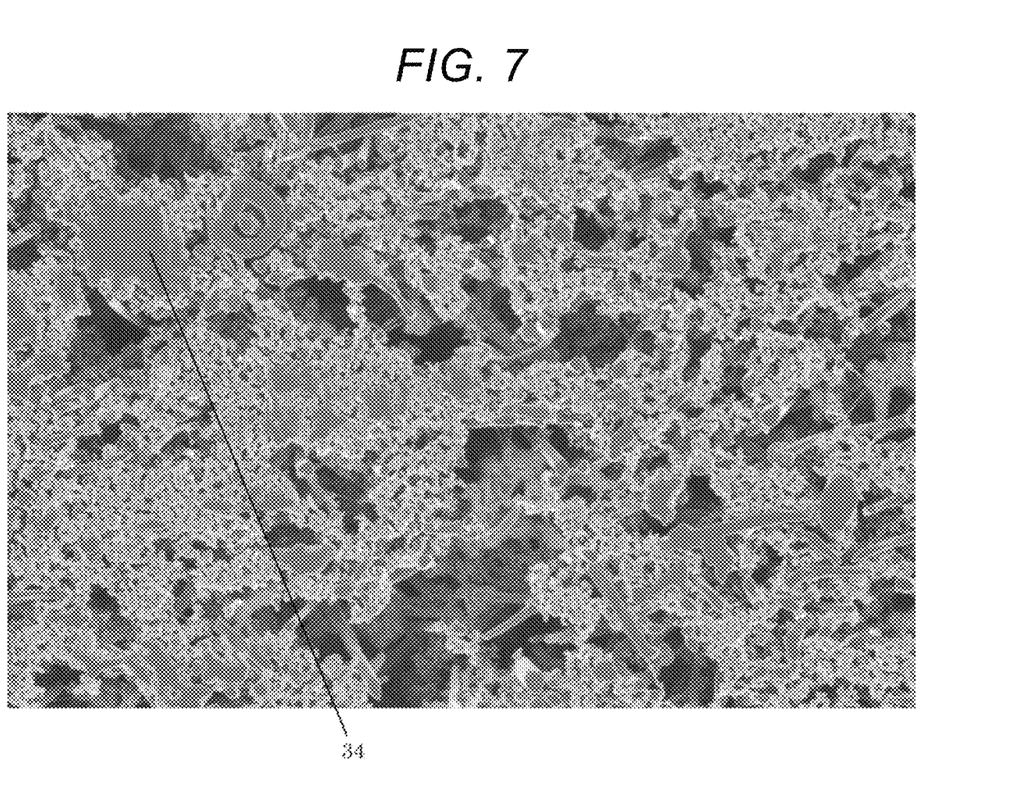
FIG. 7 is a cross-sectional SEM photograph of the modification of the gas diffusion layer according to the embodiment of the disclosure.

FIG. 7 is a cross-sectional SEM photograph of the gas diffusion layer 3M. Conductive particles 31, conductive fibers 32, and a particulate polymer resin 33P can be confirmed. Note that, the fine polymer resin 33F in a fine fibrous form is not observed due to damage by electron beams at the time of SEM observation.

EXAMPLE

Hereinafter, examples of the disclosure will be described. The following materials are used for each material, and each evaluation is implemented by the following method.

[Conductive Particle 31] Acetylene black (hereinafter, referred to as AB) (Denka Black powdered product, manufactured by Denka Company Limited), Ketjen black (hereinafter, referred to as KB) (ECP 300, manufactured by Lion)

[Conductive Fiber 32] VGCF (VGCF-H, manufactured by Showa Denko)

[Polymer Resin 33] PTFE dispersion (manufactured by Daikin)

[Pore-forming Agent] Fumaric acid (particle size 50 to 200 μm, manufactured by Nippon Shokubai)

[Gas Permeability Tester] Gurley type Densometer (manufactured by Toyo Seiki Seisaku-sho, Ltd.)

[Compression Ratio and Tensile Strength at Break Compression Testing Machine] Tensile compression testing machine (manufactured by Imada Seisakusho Co., Ltd)

[Power Generation Testing Method]

A power generation test is implemented by the following method using the gas diffusion layer 3 manufactured in Examples and Comparative Examples described below as a cathode side gas diffusion layer 3b (see FIG. 2).

Catalyst carrying carbon (TEC10E50E manufactured by Tanaka Kikinzoku Kogyo K. K., 50 mass % is Pt) in which platinum particles as an electrode catalyst are carried on carbon powder, and a polymer electrolyte solution (Acivion, D79-20 BS, manufactured by Solveisrexis Co., Ltd.) having hydrogen ion conductivity were dispersed in a mixed dispersion medium of ethanol and water (mass ratio 1:1) to prepare an ink for forming a cathode catalyst layer. The polymer electrolyte was added so that a mass of the polymer electrolyte in the catalyst layer after coating formation was 0.4 times the mass of the catalyst supporting carbon.

The obtained ink for forming the cathode catalyst layer was coated on one surface of a polymer electrolyte membrane 1 (GSII, 120 mm×120 mm, manufactured by Japan Gore-Tex Corporation) by a spray method, and a cathode catalyst layer 2b (see FIG. 2) was formed so that platinum carrying content was 0.3 mg/cm².

Next, similarly to the cathode electrode, an anode catalyst layer 2a (see FIG. 2) was formed so that the platinum carrying content was 0.1 mg/cm².

Carbon paper manufactured by SGL Company was used as the anode side gas diffusion layer 3a (see FIG. 2).

The manufactured cathode side gas diffusion layer 3b was bonded to the cathode catalyst layer 2b, and the anode side gas diffusion layer 3a was bonded to the anode catalyst layer 2a so as to obtain the MEA 20.

Next, the fuel battery 100 was manufactured by using the separator 4 on which the flow path was formed. That is, the MEA 20 was sandwiched between the anode side separator 4a including the fluid flow path 5 and a cooling water flow path for supplying the fuel gas, and the cathode side separator 4b including a gas flow path for supplying the oxidizing gas, and a gasket made of fluorinated rubber was disposed around the cathode and the anode to form a unit cell. An effective electrode (anode or cathode) area is 36 cm².

The following conditions were used when cell voltage was measured. A cell temperature was controlled to 75° C., hydrogen gas was supplied as the fuel gas to the gas flow path on the anode side, and the air was supplied to the gas flow path on the cathode side. The stoichiometry of the hydrogen gas was 1.5, and the stoichiometry of the air was 1.8. Both the fuel gas and the air were humidified so that a dew point was 75° C., and then supplied to the unit cell.

The power generation evaluation is performed by maintaining a current density from 0 A/cm² to 2.0 A/cm² with an interval of 0.5 A/cm² for three minutes, and measuring a cell voltage to record the cell voltage at 2.0 A/cm².

<Acceptance Range>

When compressed at a surface pressure of 7 kgf/cm², the compression ratio was acceptable at 85% or more and 98% or less in order to satisfy both the gas diffusibility and the adhesion with the catalyst layer.

The Gurley number was acceptable at 5 sec/100 mL or more and 150 sec/100 mL or less in order to ensure the gas diffusibility, the water discharge property, and the water retention property.

The tensile strength at break was acceptable at 0.05 N/mm² or more in order to handle as a self-supporting membrane.

The cell voltage was acceptable at 580 mV or higher in order to exceed the Comparative Examples in performance.

Examples 1 to 6

In Examples 1 to 6, the gas diffusion layer 3 was manufactured by using the manufacturing method described above. However, plasticity ratios of acetylene black, Ketjen black, VGCF and PTFE are different from each other. Specifically, a gas diffusion layer 3 with a thickness of 100 μm was manufactured according to a composition ratio shown in Table 1.

In these Examples 1 to 6, an area ratio of the aggregate 34 to the total area of the gas diffusion layer 3, an area ratio of the particulate polymer resin 33P to the total area, a cumulative pore volume, a peak of the pore diameter distribution, porosity, a compression ratio when compressed at 7 kgf/cm² (thickness when being compressed at 7 kgf/cm²/thickness before compression), a Gurley number, a tensile strength at break, and a cell voltage were measured. The results are shown in Table 1.

TABLE 1

| | Composition | | | | Measurement value | | | |
|---|---|---|---|---|---|---|---|---|
| | Composition of gas diffusion layer 3 | | | Additive | Area ratio | Area ratio | | |
| | Conductive particles 31 | | Conductive fibers 32 | Polymer resin 32 | amount of pore-forming | of aggregate | of PTFE particles | Cumulative pore | Pore diameter |
| | AB (%) | KB (%) | VGCF (%) | PTFE (%) | agent (%) | 34 to total area (%) | 33P to total area (%) | volume (mL/g) | of peak (μm) |
| Example 1 | 0 | 20 | 50 | 30 | 0 | 2.8 | 0.5 | 1.45 | 0.10 |
| Example 2 | 20 | 0 | 50 | 30 | 0 | 2.3 | 0.6 | 1.38 | 0.12 |
| Example 3 | 0 | 30 | 40 | 30 | 0 | 0.7 | 0.2 | 1.62 | 0.09 |
| Example 4 | 0 | 10 | 60 | 30 | 0 | 5.0 | 0.7 | 1.20 | 0.20 |
| Example 5 | 0 | 30 | 50 | 20 | 0 | 1.2 | 0.1 | 1.70 | 0.08 |
| Example 6 | 0 | 10 | 50 | 40 | 0 | 3.9 | 1.0 | 1.00 | 0.30 |
| Example 7 | 0 | 10 | 70 | 20 | 0 | 6.2 | 0.5 | 1.30 | 0.24 |
| Example 8 | 0 | 10 | 75 | 15 | 0 | 7.8 | 0.2 | 1.44 | 0.28 |
| Example 9 | 10 | 0 | 60 | 30 | 0 | 4.7 | 0.6 | 1.18 | 0.18 |
| Example 10 | 10 | 0 | 70 | 20 | 0 | 5.9 | 0.4 | 1.27 | 0.22 |
| Example 11 | 10 | 0 | 75 | 15 | 0 | 7.5 | 0.1 | 1.45 | 0.25 |
| Comparative Example 1 | 0 | 20 | 50 | 30 | 20 | 0 | 0 | 3.49 | 0.25 2.5 |
| Comparative Example 2 | 0 | 40 | 30 | 30 | 0 | 0.3 | 0.1 | 1.90 | 0.04 |
| Comparative Example 3 | 0 | 35 | 50 | 15 | 0 | 0.6 | 0 | 1.80 | 0.08 |

TABLE 1-continued

| | Porosity (%) | Compression ratio (%) when being compressed at 7 kgf/cm² | Gurley number (sec/100 mL) | Tensile strength at break (N/mm) | Cell voltage (mV) | Evaluation |
|---|---|---|---|---|---|---|
| Example 1 | 70 | 92 | 74 | 0.42 | 620 | ○ |
| Example 2 | 68 | 93 | 56 | 0.44 | 605 | ○ |
| Example 3 | 72 | 85 | 135 | 0.25 | 580 | ○ |
| Example 4 | 66 | 95 | 59 | 0.47 | 610 | ○ |
| Example 5 | 74 | 87 | 120 | 0.22 | 590 | ○ |
| Example 6 | 65 | 93 | 67 | 0.45 | 615 | ○ |
| Example 7 | 73 | 94 | 16 | 0.23 | 640 | ○ |
| Example 8 | 74 | 93 | 18 | 0.14 | 600 | ○ |
| Example 9 | 71 | 97 | 41 | 0.87 | 630 | ○ |
| Example 10 | 72 | 97 | 12 | 0.16 | 640 | ○ |
| Example 11 | 74 | 94 | 14 | 0.09 | 605 | ○ |
| Comparative Example 1 | 85 | 71 | 9 | 0.12 | 540 | x |
| Comparative Example 2 | 79 | 83 | 58 | 0.26 | 550 | x |
| Comparative Example 3 | 74 | 87 | 68 | 0.12 | 560 | x |

Examples 7 to 11

In Examples 7 to 11, the gas diffusion layer 3 was manufactured by using the manufacturing method described above. However, plasticity ratios of acetylene black, Ketjen black, VGCF and PTFE are different from each other. Specifically, a gas diffusion layer 3 with a thickness of 140 µm was manufactured according to a composition ratio shown in Table 1.

In these Examples 7 to 11, an area ratio of the aggregate 34 to the total area of the gas diffusion layer 3, an area ratio of the particulate polymer resin 33P to the total area, a cumulative pore volume, a peak of the pore diameter distribution, porosity, a compression ratio when compressed at 7 kgf/cm² (thickness when being compressed at 7 kgf/cm²/thickness before compression), a Gurley number, a tensile strength at break, and a cell voltage were measured. The results are shown in Table 1.

Comparative Examples 1 to 3

In Comparative Example 1, a pore-forming agent (fumaric acid) was added with respect to that in Example 1, and a gas diffusion layer 3 having a thickness of 100 µm was manufactured by using the same manufacturing method.

In Comparative Example 2, the amount of the conductive particles (KB) was larger than that of the conductive fiber (VGCF) with respect to Example 1, and a gas diffusion layer 3 having a thickness of 100 µm was manufactured by using the same manufacturing method.

In these Comparative Examples 1 to 3, an area ratio of the aggregate 34 to the total area of the gas diffusion layer 3, an area ratio of the particulate polymer resin 33P to the total area, a cumulative pore volume, a peak of the pore diameter distribution, porosity, a compression ratio when compressed at 7 kgf/cm² (thickness when being compressed at 7 kgf/cm²/thickness before compression), a Gurley number, a tensile strength at break, and a cell voltage were measured. The results are shown in Table 1.

As shown in Table 1, in the gas diffusion layer 3 of Examples 1 to 11, the aggregate 34 inside the gas diffusion layer 3 is formed in an area ratio of 0.5% or more with respect to the gas diffusion layers 3 of Comparative Examples 1 and 2. Therefore, gas diffusibility, water retention property, and excessive water discharge property particularly at a high current density were improved. As a result, it can be confirmed that, as shown in Table 1, the cell voltage at a high current density of 2.0 A/cm² was greatly increased.

Further, in the gas diffusion layer 3 of Examples 1 to 11, the particulate polymer resin 33P inside the gas diffusion layer 3 is formed in an area ratio of 0.1% or more with respect to the gas diffusion layers 3 of Comparative Example 3. Therefore, water could be prevented from retaining inside the gas diffusion layer 3 particularly at a high current density. As a result, it can be confirmed that, as shown in Table 1, the cell voltage at a high current density of 2.0 A/cm² was greatly increased.

<Function and Effects>

As described above, the gas diffusion layer 3 according to the embodiment of the disclosure is configured by a porous member 30 containing the conductive fibers 31, the conductive fibers 32, and the polymer resin 33 as main components; the aggregate 34 of the conductive fibers 32 is formed inside the porous member 30; and an area ratio of the aggregate 34 in any cross-section of the porous member 30 is 0.5% or more and 8% or less.

With such a configuration, the vacancies inside the aggregate 34 serve as a gas diffusion route and also function as a conductive path, so that the gas diffusibility and conductivity are improved and the power generation performance of the fuel battery 100 using the gas diffusion layer 3 is improved.

Further, gas diffusion under the rib portion 6 to which a load is applied at the time of fastening can be ensured since the aggregate 34 of the conductive fibers 32 is not collapsed by a fastening pressure at the time of manufacturing the fuel battery 100 by stacking a plurality of the battery cells 10. Further, the water repellency in the vicinity of the PTFE particles can be increased and the water can be prevented from retaining inside the porous member 30 since the polymer resin is made of polytetrafluoroethylene (PTFE), and the porous member 30 includes the fibrous polymer resin 33F which is a PTFE in a fibrous form and the particulate polymer resin 33P which is a PTFE in a particulate form inside.

The gas diffusion layer for a fuel battery of the disclosure can realize both improvement of power generation performance of the fuel battery and reduction in cost. Accordingly, the gas diffusion layer for a fuel battery of the disclosure can also be applied to applications such as a cogeneration system used for household, a fuel battery used for automobile, a fuel battery used for mobile, and a fuel battery used for backup.

What is claimed is:

1. A gas diffusion layer for a fuel battery, the gas diffusion layer comprising:
   a porous member containing conductive particles, conductive fibers, and a polymer resin,
   wherein an amount of the conductive fibers in the porous member is sufficient to form aggregates of the conductive fibers inside the porous member, wherein each of the aggregates contains no more than 10% conductive particles, and
   wherein an area ratio of the aggregates in any cross-section of the porous member is 0.5% or more and 5% or less.

2. The gas diffusion layer for the fuel battery according to claim 1, wherein the amount of the conductive fibers in the porous member is larger than an amount of the conductive particles.

3. The gas diffusion layer for the fuel battery according to claim 1, wherein a diameter of each of the aggregates is 1 μm to 20 μm.

4. The gas diffusion layer for the fuel battery according to claim 1, wherein each of the conductive fibers is a carbon nanotube having a fiber diameter of 50 nm or more and 300 nm or less and a fiber length of 0.5 μm or more and 50 μm or less.

5. The gas diffusion layer for the fuel battery according to claim 1, wherein the porous member contains 5 wt % or more and less than 35 wt % of the conductive particles, 35 wt % or more and 80 wt % or less of the conductive fibers, and 10 wt % or more and 40 wt % or less of the polymer resin.

6. The gas diffusion layer for the fuel battery according to claim 1, wherein the polymer resin is polytetrafluoroethylene.

7. The gas diffusion layer for the fuel battery according to claim 6, wherein the polymer resin includes polytetrafluoroethylene in a fibrous form and polytetrafluoroethylene in a particulate form.

8. The gas diffusion layer for the fuel battery according to claim 7, wherein a diameter of the polytetrafluoroethylene in the particulate form is 0.1 μm or more and 10 μm or less.

9. The gas diffusion layer for the fuel battery according to claim 7, wherein an area ratio of the polytetrafluoroethylene in the particulate form in any cross-section is 0.1% or more and 1% or less.

10. The gas diffusion layer for the fuel battery according to claim 1, wherein a cumulative pore volume of the porous member is 1.0 mL/g or more and 1.7 mL/g or less, and a peak of pore size distribution is 0.05 μm or more and 0.5 μm or less.

11. The gas diffusion layer for the fuel battery according to claim 1, wherein a porosity of the porous member is 65% or more and 75% or less.

12. The gas diffusion layer for the fuel battery according to claim 1, wherein a Gurley number of the porous member is 5 sec/100 mL or more and 150 sec/100 mL or less.

13. The gas diffusion layer for the fuel battery according to claim 1, wherein the porous member has a tensile strength at break of 0.05 N/mm$^2$ or more, and is a self-supporting membrane supported only by the conductive particles, the conductive fibers, and the polymer resin.

14. The gas diffusion layer for the fuel battery according to claim 1, wherein a thickness of the porous member is 70 μm or more and 200 μm or less.

15. A membrane electrode assembly comprising the gas diffusion layer for the fuel battery according to claim 1.

16. A fuel battery comprising the gas diffusion layer for the fuel battery according to claim 1.

* * * * *